US010307978B2

(12) United States Patent
Kawatani et al.

(10) Patent No.: US 10,307,978 B2
(45) Date of Patent: Jun. 4, 2019

(54) TIRE PUNCTURE REPAIR KIT

(71) Applicants: SUMITOMO RUBBER INDUSTRIES, LTD., Kobe-shi, Hyogo (JP); UNIK WORLD IND. CO., LTD., Tainan (TW)

(72) Inventors: Akihiko Kawatani, Kobe (JP); Tsutomu Kono, Kobe (JP); Vincent Chou, Tainan (TW)

(73) Assignees: SUMITOMO RUBBER INDUSTRIES, LTD., Kobe-shi, Hyogo (JP); UNIK WORLD IND. CO., LTD., Tainan (TW)

( * ) Notice: Subject to any disclaimer, the term of this patent is extended or adjusted under 35 U.S.C. 154(b) by 345 days.

(21) Appl. No.: 15/121,122

(22) PCT Filed: Dec. 3, 2014

(86) PCT No.: PCT/JP2014/082032

§ 371 (c)(1),
(2) Date: Aug. 24, 2016

(87) PCT Pub. No.: WO2015/129124

PCT Pub. Date: Sep. 3, 2015

(65) Prior Publication Data

US 2017/0015072 A1 Jan. 19, 2017

(30) Foreign Application Priority Data

Feb. 25, 2014 (JP) ................................ 2014-034463
Sep. 9, 2014 (JP) ................................ 2014-183531

(51) Int. Cl.
*B29C 73/16* (2006.01)
*B29D 30/06* (2006.01)
(Continued)

(52) U.S. Cl.
CPC .......... *B29C 73/166* (2013.01); *B29C 73/025* (2013.01); *B29D 30/0681* (2013.01);
(Continued)

(58) Field of Classification Search
CPC ................ B29C 73/025; B29C 73/166; B29D 30/0681; B29D 30/0685; B29D 2030/0698
See application file for complete search history.

(56) References Cited

U.S. PATENT DOCUMENTS 8,522,833 B2 * 9/2013 Chou .................... F04B 35/008 141/38
8,684,046 B2 * 4/2014 Kojima ................ B29C 73/166 141/38
(Continued)

FOREIGN PATENT DOCUMENTS

DE 20 2013 101 989 U1 7/2013
EP 2 620 271 A1 7/2013
(Continued)

OTHER PUBLICATIONS

Extended European Search Report dated Aug. 21, 2017, in European Patent Application No. 14883896.4.
(Continued)

*Primary Examiner* — James P Mackey
(74) *Attorney, Agent, or Firm* — Birch, Stewart, Kolasch & Birch, LLP

(57) ABSTRACT

To control compressed air to a prescribed pressure without using a relief valve and a chamber and to suppress deviation of the pressure. A compressor device 2 of a puncture repair kit 1 has a pressure gauge 6. The pressure gauge 6 has a tubular body portion 18 provided in a front end portion with a communicating hole 21 communicating with a surge chamber 12B, a piston 19 movable within the tubular body portion 18 in the longitudinal direction by the compressed
(Continued)

SW 4H 2 24 6 T 28 3 29 2A 37 1 38 39

2 4 Q 24 6 M 5 40 43 15 7 8 16 2A 9A 9B 9 air from the communicating hole 21, and a spring 20 biasing the piston 19 toward the front end and changing its displacement according to the magnitude of the pressure of the compressed air. An exhaust port 25 is formed on the peripheral wall of the tubular body portion 18. The exhaust port 25 releases the compressed air when a seal ring 23 of the piston 19 exceeds the exhaust port 25.

12 Claims, 14 Drawing Sheets

(51) Int. Cl.
*B29C 73/02* (2006.01)
*B29L 30/00* (2006.01)

(52) U.S. Cl.
CPC .. *B29D 30/0685* (2013.01); *B29D 2030/0698* (2013.01); *B29L 2030/00* (2013.01)

(56) References Cited

U.S. PATENT DOCUMENTS

| | | | | |
|---|---|---|---|---|
| 9,044,903 | B2 * | 6/2015 | Nakao | B29C 73/166 |
| 2013/0000777 | A1 * | 1/2013 | Kojima | B29C 73/166 141/38 |
| 2013/0199666 | A1 | 8/2013 | Nakao et al. | |
| 2013/0284313 | A1 | 10/2013 | Kojima et al. | |

FOREIGN PATENT DOCUMENTS

| | | | |
|---|---|---|---|
| JP | 2006-103498 | A | 4/2006 |
| JP | 2010-173118 | A | 8/2010 |
| JP | 2012-101373 | A | 5/2012 |
| WO | WO 2012/060296 | A1 | 5/2012 |
| WO | WO 2012/102078 | A1 | 8/2012 |

OTHER PUBLICATIONS

International Search Report, issued in PCT/JP2014/082032, PCT/ISA/210, dated Feb. 10, 2015.

Written Opinion of the International Searching Authority, issued in PCT/JP2014/082032, PCT/ISA/237, dated Feb. 10, 2015.

* cited by examiner

T
3
28
29
38
39
37
1
2A
6
24
2
4H
SW

TIRE PUNCTURE REPAIR KIT

TECHNICAL FIELD

The present invention relates to a tire puncture repair kit for fixing a puncture of a tire by injecting a puncture repair liquid and compressed air in succession to the punctured tire.

BACKGROUND TECHNIQUE

As a puncture repair kit for fixing a puncture, there has been proposed a kit employing a compressor device for generating compressed air, and a bottle unit in which an extraction cap is attached to a mouth portion of the bottle containing the puncture repair liquid (see, for example, Patent Document 1).

In the above-mentioned puncture repair kit, by utilizing the compressed air from the compressor device, the puncture repair liquid from the bottle unit is injected to the tire.

Then, by using the compressed air supplied successively, the tire pressure is increased while visually checking a pressure gauge. After it has been confirmed that the tire pressure has reached to the required pressure, the increase of the pressure is stopped.

The compressor device is provided with a relief valve to release overpressure when the compressed air exceeds a prescribed pressure.

The prescribed pressure is set to the permissible maximum pressure for the normal tire, therefore, the tire is prevented from being damaged by applying a pressure exceeding the prescribed pressure.

In the above-mentioned puncture repair kit, if the pressure of the tire whose puncture has been repaired is increased to the relief pressure of the relief valve by keeping the compressor device switched on, then a divergence phenomenon such that the actual internal pressure of the tire becomes higher than the pressure indicated by the pressure gauge, tends to occurs.

Therefore, in the Patent Document 1, it has been proposed to suppress the divergence phenomenon by connecting a chamber for storing the compressed air to a surge chamber of the compressor device.

In this case, however, the relief valve and the chamber are needed separately. This is an obstacle to miniaturization and cost reduction of the compressor device.

PRIOR ART DOCUMENT

Patent Document

Patent Document 1: Japanese Patent Application Publication No. 2012-101373

SUMMARY OF THE INVENTION

Problems that the Invention is to Solve

It is a problem of the present invention to provides a tire puncture repair kit which can achieve the suppression of the divergence phenomenon of the indicated pressure, and the controlling of the pressure of the compressed air without using a relief valve and a chamber, and which can reduce the size and cost of the compressor device.

Means for Solving the Problems

The present invention is a puncture repair kit having
- a compressor device, and
- a bottle unit in which an extraction cap is fitted to a mouth portion of a bottle container containing a puncture repair liquid, characterized in that the extraction cap has an intake port portion for feeding compressed air from the compressor device into the bottle container, and an outlet port portion for taking out the puncture repair liquid and the compressed air in succession from the bottle container by the feeding of the compressed air, the compressor device has

- a compressor main body having
- a cylinder having
  - a main cylinder part forming a pump chamber for compressing the air, and
  - a sub-cylinder part forming a surge chamber being contiguous to the main cylinder part and receiving the compressed air from the pump chamber, and a pressure gauge for measuring the pressure of the compressed air in the surge chamber, the pressure gauge has a tubular body portion provided in a front end portion with a communicating hole communicating with the surge chamber, and having a rear end portion to which a cap is attached, a piston having a seal ring sealing between the piston and the inner peripheral surface of the tubular body portion, and being movable within the tubular body portion in the longitudinal direction by the compressed air from the communicating hole, a spring disposed between the piston and the cap so as to bias the piston toward the front end, and changing the displacement by the magnitude of the pressure of the compressed air, an indicator portion disposed on a peripheral wall of the tubular body portion and indicating the amount of move of the piston, and an exhaust port formed on the peripheral wall of the tubular body portion, wherein when the compressed air reaches to a prescribed pressure and the seal ring exceeds the exhaust port, the exhaust port communicates with the communicating hole, and exhausts the compressed air.

Effect of the Invention

In the tire puncture repair kit according to the present invention, the pressure gauge of the compressor device functions as follows.

In the pressure gauge, the spring is displaced in accordance with the magnitude of the pressure of the compressed air flowing into the tubular body portion from the surge chamber, and moves the piston toward the rear end.

The indicator portion indicates the amount of movement of the piston, and thereby, it can function as a pressure gauge to indicate the pressure of the compressed air.

The pressure gauge has an exhaust port in the peripheral wall of the tubular body.

when the compressed air reaches to the prescribed pressure and the seal ring of the piston exceeds the exhaust port, the exhaust port can exhaust the compressed air.

That is, the pressure gauge also functions as a relief valve capable of releasing overpressure from the exhaust port to control the compressed air to the prescribed pressure.

Further, since the pressure gauge functions as a relief valve, a time lag does not occur between the pressure control and the indicated pressure of the compressed air.

As a result, it becomes possible to suppress the divergence phenomenon between the actual tire pressure and the indicated pressure, without connecting the chamber to the surge chamber. Thus, the need to provide a relief valve and the chamber is eliminated, therefore, the number of parts and the storage volume can be reduced. This can greatly contribute to miniaturization and cost reduction of the compressor device. Further, since the structure of the pressure gauge is simple, it is also possible to reduce the cost of the pressure gauge itself as compared with that of conventional Bourdon tube type, bellows type and the like.

MODE FOR CARRYING OUT THE INVENTION

Hereinafter, embodiments of the present invention will be described in detail.

Figure 1:
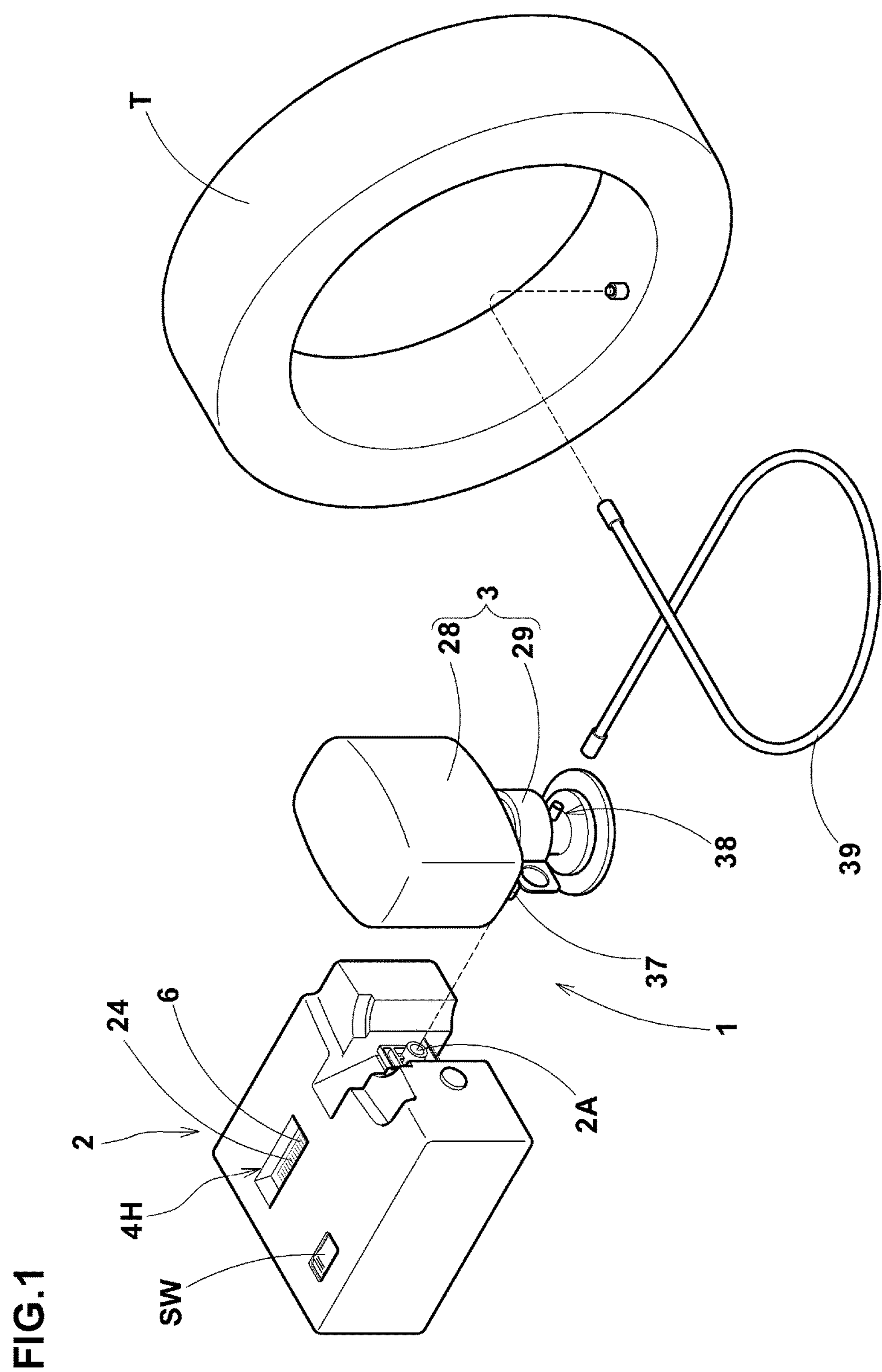
FIG. 1 a perspective view showing an example of a usage state of a tire puncture repair kit of the present invention.

In FIG. 1, an example of the usage state of the tire puncture repair kit 1 of the present invention is shown.

The puncture repair kit 1 is composed of a compressor device 2 having a compressed air discharging port portion 2A for discharging compressed air, and a bottle unit 3.

The bottle unit 3 has a bottle container 28 containing a puncture repair liquid, and an extraction cap 29 attached to a mouth portion thereof.

The extraction cap 29 has an intake port portion 37 for feeding the compressed air from the compressor device 2 into the bottle container 28, and an outlet port portion 38 for taking out the puncture repair liquid and the compressed air in succession from the bottle container 28 by the feeding of the compressed air.

In this example, the compressed air discharging port portion 2A of the compressor device 2 and the intake port portion 37 of the bottle unit 3 are directly connected without using a hose. The outlet port portion 38 of the bottle unit 3 and the tire T are connected by a hose 39.

Figure 2:
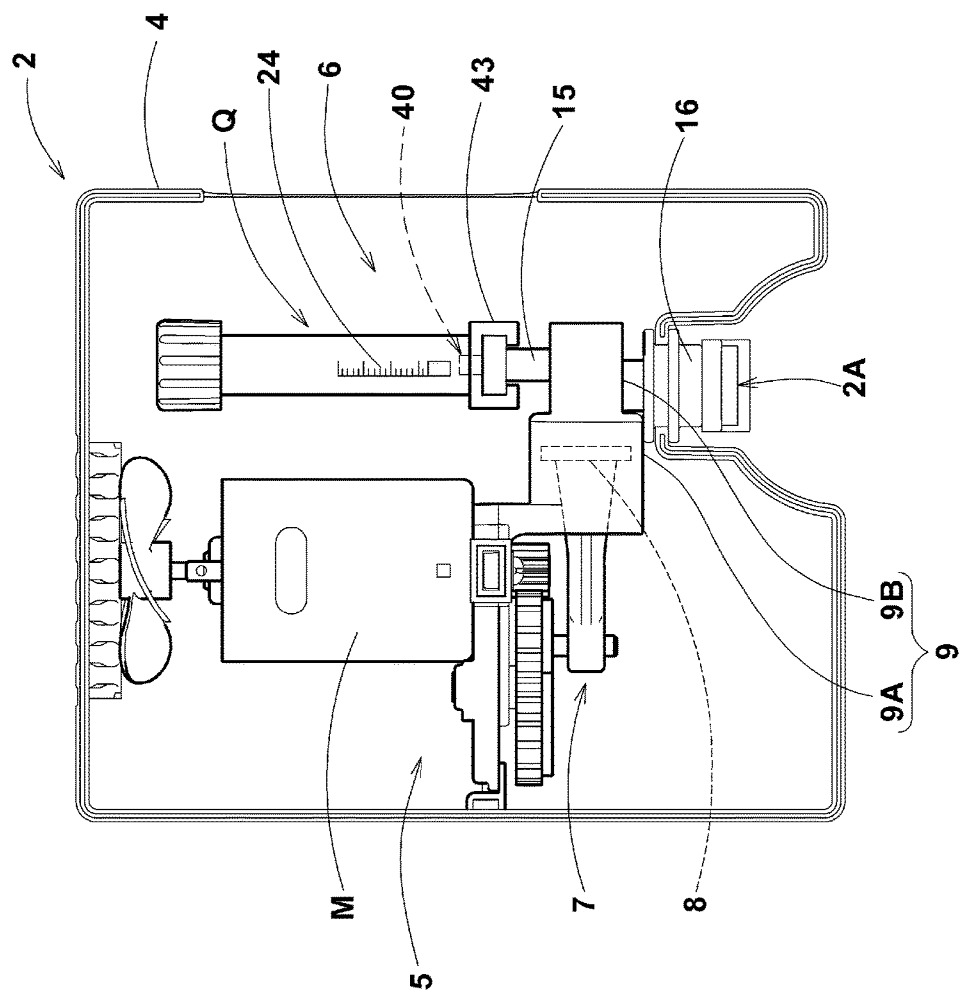
FIG. 2 a plan view showing the inside of the compressor device used in the puncture repair kit.

As shown in FIG. 2, the compressor device 2 provided in a storage case 4 with at least a compressor main body 5 for generating compressed air, and a pressure gauge 6 for measuring the pressure of the compressed air.

The compressor main body 5 has a motor M, a piston 8 connected to the motor M via a crank mechanism 7, and a cylinder 9 housing the piston 8 so as to be able to reciprocate.

As the motor M, a variety of commercially available DC motors which can operate at 12 v DC power of the motor vehicle can be used.

A power supply cord provided at an end with a power plug connectable to a cigarette lighter socket of a car is connected to the motor M through a power switch sw (FIG. 1) attached to an upper plate part of the housing case 4.

As the crank mechanism 7, those of various known structures can be used.

The cylinder 9 has a main cylinder part 9A and a sub cylinder portion 9B.

Figure 4:
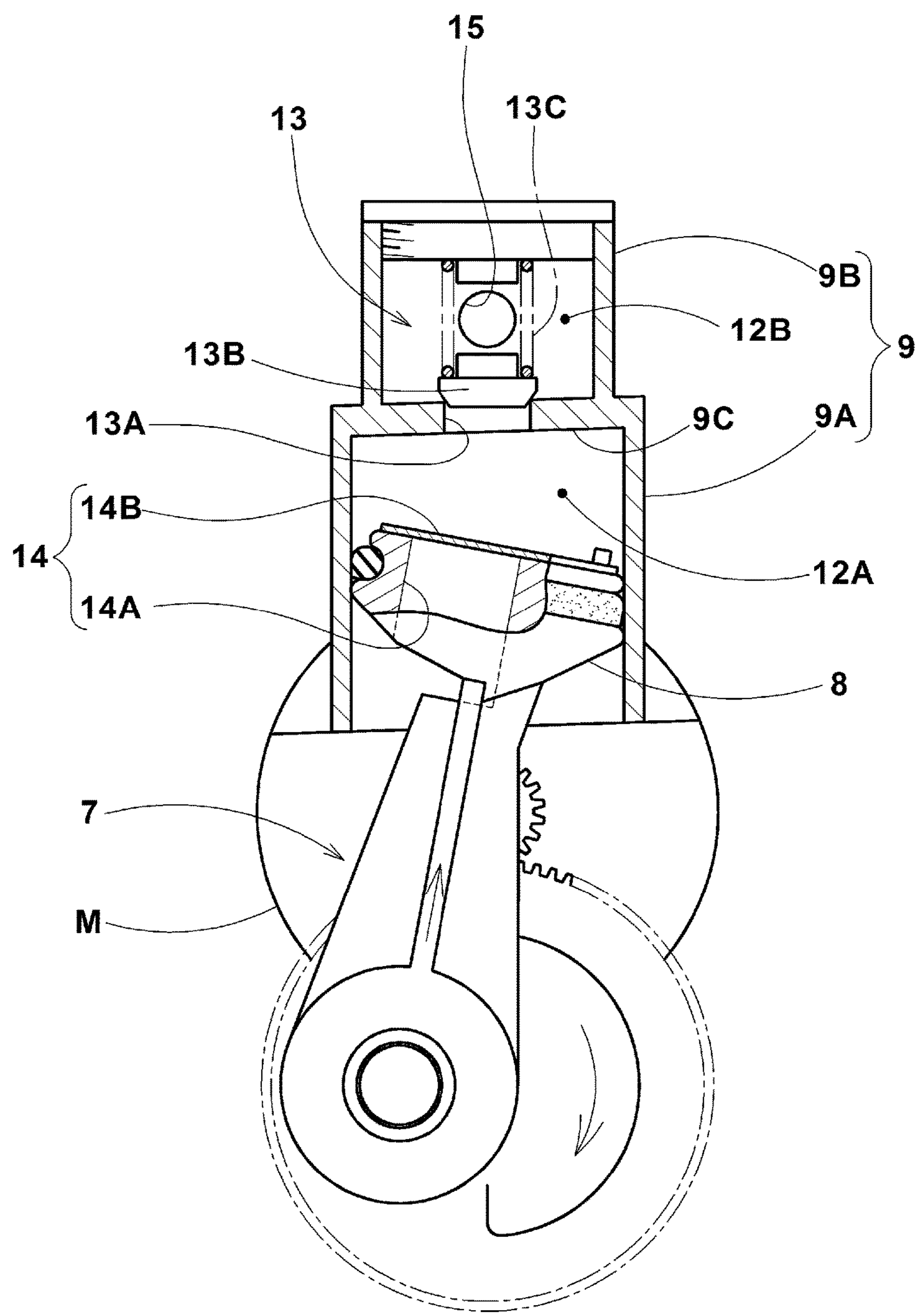
FIG. 4 a cross-sectional view showing a cylinder together with a piston.

As shown in FIG. 4, the main cylinder part 9A houses the piston 8 so as to be able to reciprocate from the bottom dead point to the top dead point, and forms a pump chamber 12A for compressing the air between the piston 8.

The sub cylinder portion 9B is continuous with the main cylinder part 9A, and forms a surge chamber 12B receiving the compressed air compressed by the pump chamber 12A via a one-way valve 13 in this example.

The surge chamber 12B suppresses pulsation of the compressed air from the pump chamber 12A and stabilizes the pressure.

The piston 8 in this example is provided with an intake valve 14 for sucking the outside air into the pump chamber 12A.

The intake valve 14 is formed by an intake hole 14A extending in the axial direction through the piston 8, and a valve 14B formed from an elastic body, for example, rubber, synthetic resin, metal or the like, and closing the intake hole 14A from the pump chamber 12A side by its spring nature.

The one-way valve 13 is composed of a connecting hole 13A formed in a partition wall portion 9*c* between the pump chamber 12A and the surge chamber 12B, a valve body 13B constructed by a rubber member for example, and closing the connecting hole 13A from the surge chamber 12B side, and a spring 13C for biasing the valve body 13B toward the connecting hole 13A.

The one-way valve 13 is actuated by the pressurization of the pump chamber 12A to open the connecting hole 13A.

Figure 3:
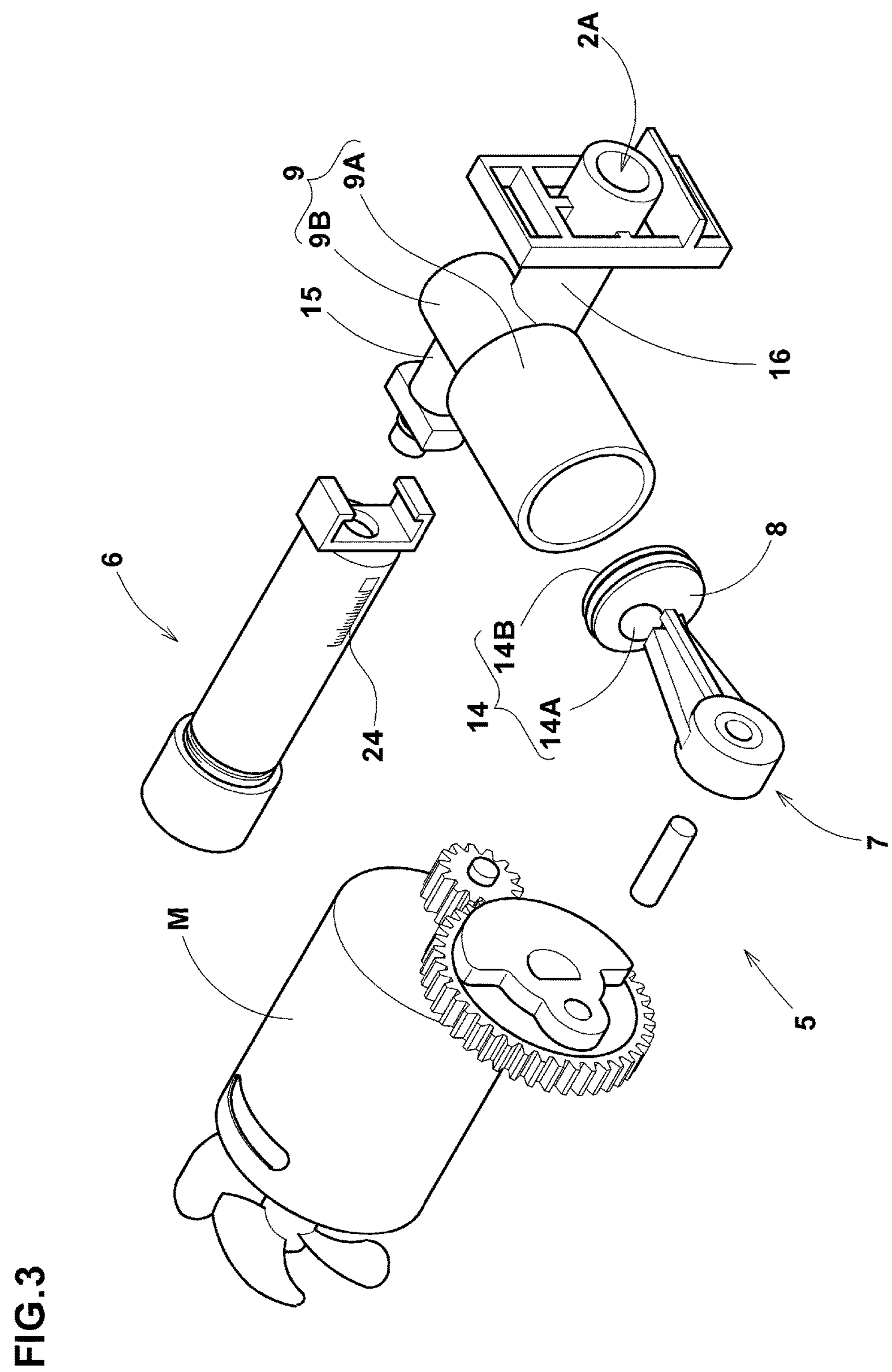
FIG. 3 a perspective view showing a major portion of the compressor device.

As shown in FIGS. 2 and 3, tubular portions 15 and 16 protrude from the sub-cylinder part 9B.

The pressure gauge 6 is connected to one tubular portion 15. The other tubular portion 16 constitutes the compressed air discharging port portion 2A for discharging the compressed air toward the bottle unit 3.

Figure 5:
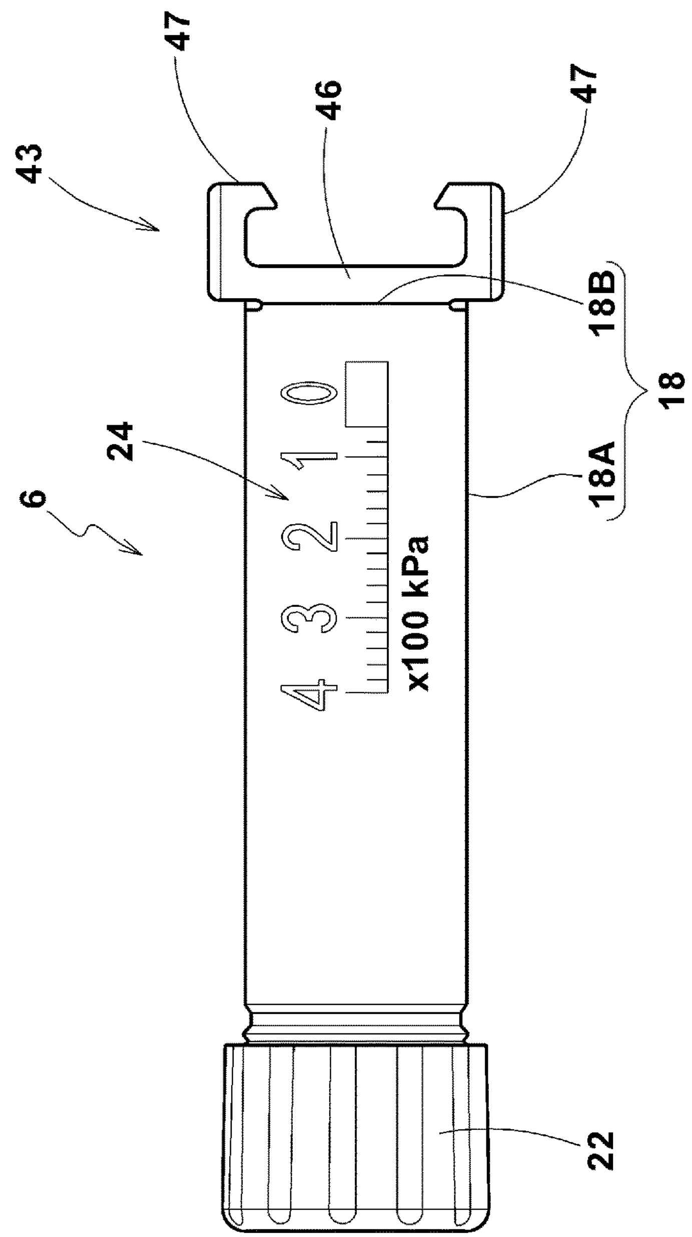
FIG. 5 a plan view showing a pressure gauge.
Figure 6:
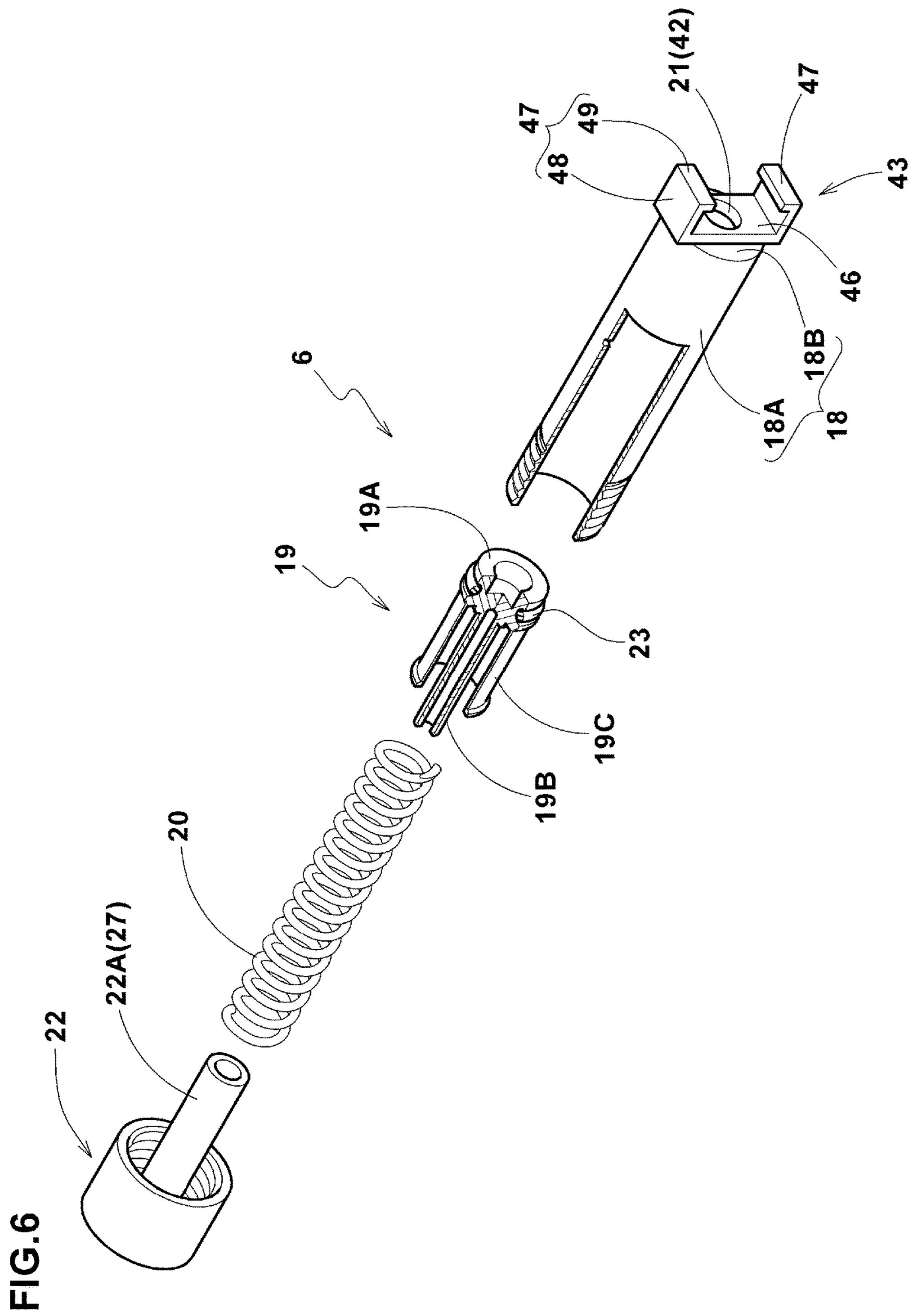
FIG. 6 an exploded perspective view of the pressure gauge.
Figure 7:
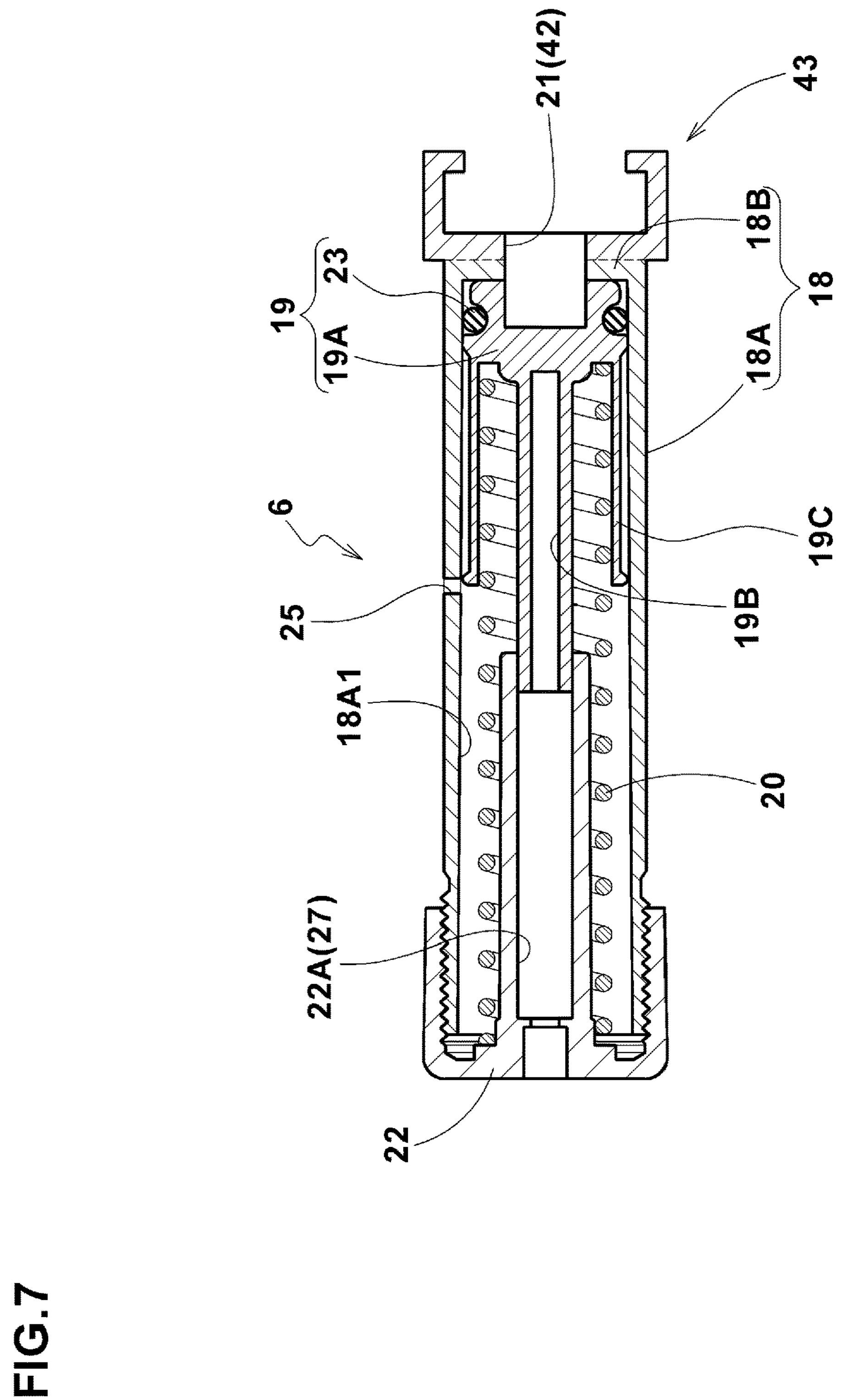
FIG. 7 a sectional view showing the pressure gauge.

As shown in FIGS. 5-7, the pressure gauge 6 comprises a tubular body portion 18, a piston 19, and a spring 20.

The tubular body portion 18 has, at its front end portion, a communicating hole 21 communicating with the surge chamber 12B, and a cap 22 is attached to its rear end portion. specifically, the tubular body portion 18 in the present embodiment has a tubular main body 18A having a center hole 18A1, and a front wall portion 18B arranged at the front end thereof. The communicating hole 21 penetrates through the front wall portion 18B, and thereby the surge chamber 12B is communicated with the center hole 18A1.

The cap 22 for closing the rear end is screwed to the main body 18A.

The piston 19 includes a piston body 19A made of, for example, a synthetic resin or the like and loosely inserted into the tubular body portion 18, and a seal ring 23 such as an O-ring attached to the outer periphery of the piston body 19A.

The seal ring 23 seals between the inner peripheral surface of the tubular body portion 18.

By the compressed air from the communicating hole 21, the piston 19 can be moved within the tubular body portion 18 in the longitudinal direction thereof.

The spring 20 is disposed between the piston 19 and the cap 22 to bias the piston 19 toward the front end.

The spring 20 in this example is a compression coil spring, and its displacement (amount of compression in this example) is changed by the magnitude of the pressure of the compressed air.

The cap 22 in this example is provided with a holding tubular portion 22A in a protruding condition for concentrically holding the spring 20 by being inserted into the spring 20. The holding tubular portion 22A also functions as a guide portion 27 for concentrically guiding the piston 19. More specifically, the piston 19 in this example has a guide shaft portion 19B concentrically extending backward from the rear end of the piston body 19A.

The guide shaft portion 19B is slidably inserted in the center hole of the holding tubular portion 22A. Thereby, the piston 19 is guided concentrically.

Further, the peripheral wall of the tubular body portion 18 is provided with an indicator portion 24 (shown in FIG. 5) for indicating the amount of moving of the piston 19.

In the indicator portion 24 in this example, a scale for indicating the movements of the piston 19 in terms pressures is formed by stamping, printing or the like.

The pointer of the indicator portion 24 is the seal ring 23 of the piston 19.

Specifically, at least a portion of the tubular body portion 18 where the indicator portion 24 is transparent. As the seal ring 23 is visible through the transparent portion, it can indicate the moved position of the piston 19, that is, the pressure of the compressed air. Namely, it can function as a pressure gauge.

The piston 19 is provided with a tubular blindfold portion 19*c* for covering the spring 20 and the like so that the spring 20 and the like do not to appear in the transparent portion.

The blindfold portion 19*c* concentrically extends backward from the rear end of the piston body 19A, and covers the periphery of the spring 20.

Further, the peripheral wall of the tubular body portion 18 is provided with an exhaust port 25 (shown in FIG. 7). when the compressed air reaches to the predetermined pressure, and the seal ring 23 exceeds the exhaust port 25, then the exhaust port 25 communicates with the communicating hole 21, and exhausts the compressed air.

That is, the pressure gauge 6 also functions as a relief valve to escape overpressure from the exhaust port 25 and to regulate the compressed air under the prescribed pressure.

Since the pressure gauge 6 itself acts as a relief valve as described above, a time lag between the pressure control and pressure indication of the compressed air does not occur. As a result, it is possible to suppress the divergence phenomenon between the actual tire pressure and indicated pressure without connecting the chamber to the surge chamber 12B.

Figure 8:
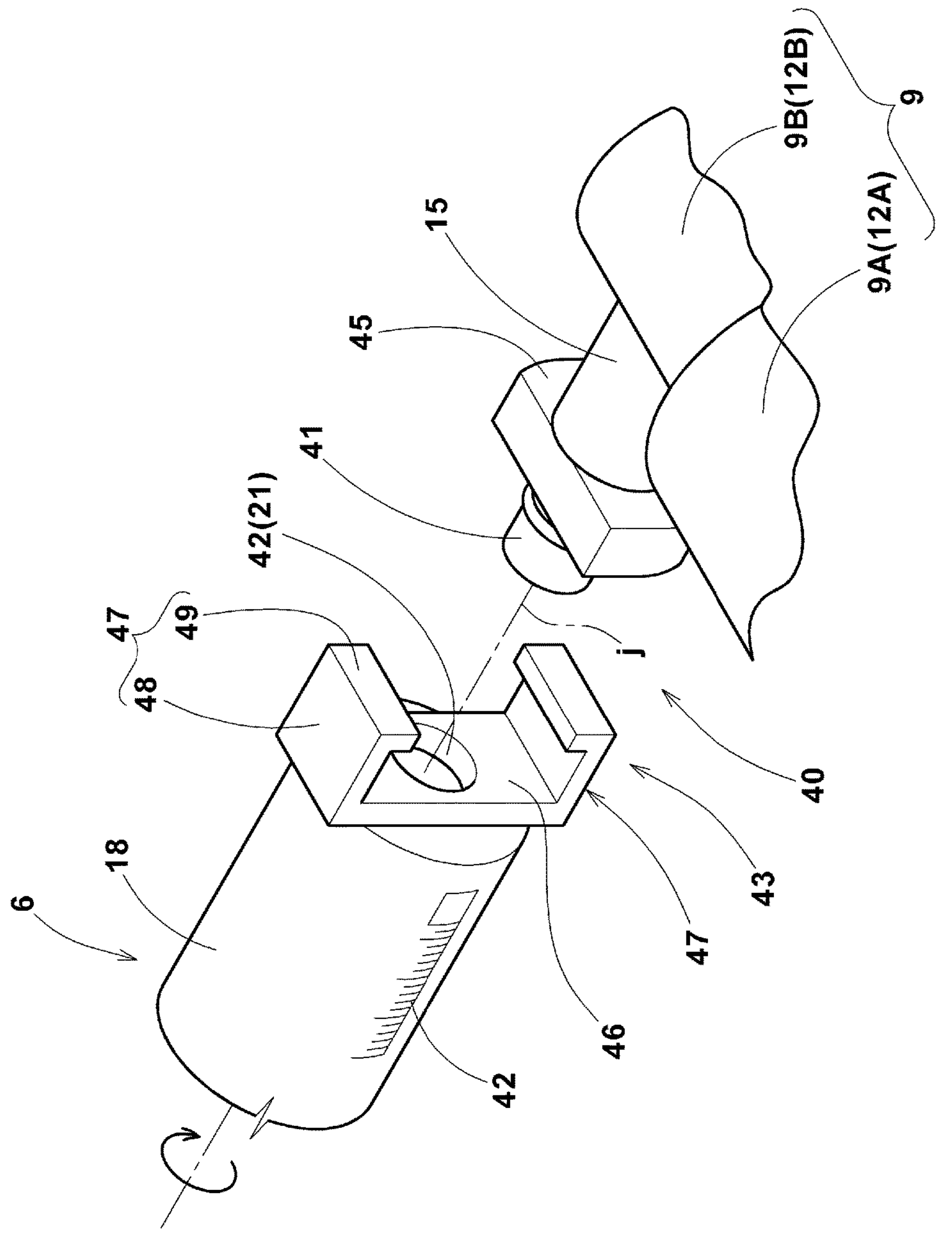
FIG. 8 an exploded perspective view showing a connecting means.

In this example, as shown in FIG. 8, the pressure gauge 6 and the sub-cylinder part 9B are connected through a connecting means 40 at one touch. Therefore, the assembly work of the compressor device 2 can be improved.

Figure 10:
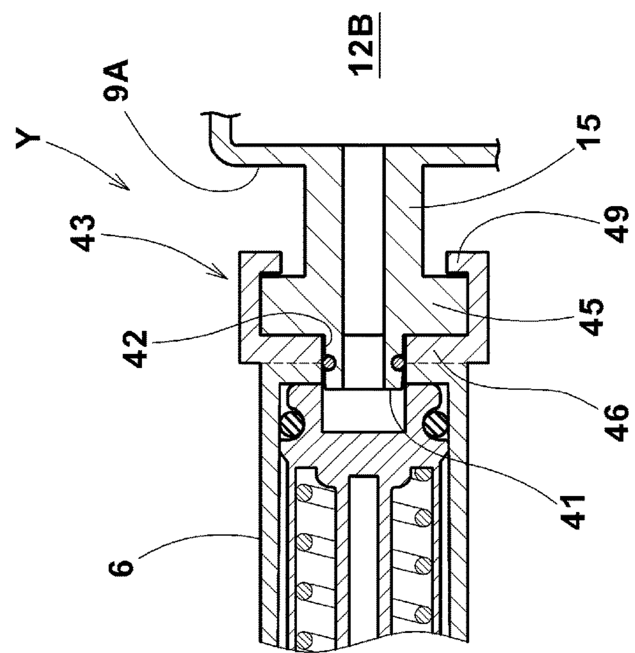
FIG. 10 a cross-sectional view showing the retaining means.

The connecting means 40 has a connecting nozzle 41 which is provided on one of the tubular body portion 18 and the sub-cylinder part 9B, and which projects toward the other, a nozzle socket 42 which is provided on the other, and into which the connecting nozzle 41 is inserted concentrically and airtightly, and a retaining means 43 which prevents the connecting nozzle 41 from deviating from the insertion state Y (shown in FIG. 10).

In this example, the connecting nozzle 41 is protruded on the sub-cylinder part 9B side via the tubular portion 15, and the nozzle socket 42 are formed on the tubular body portion 18 side.

Figure 13:
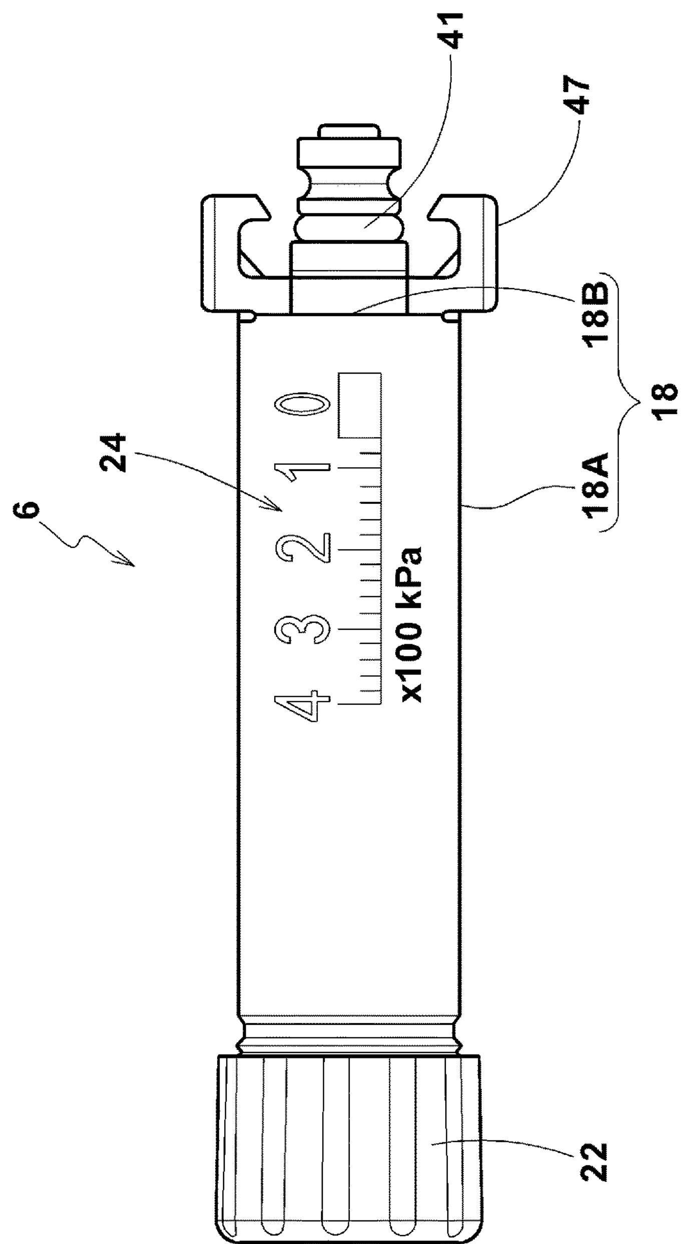
FIG. 13 a plan view of a pressure gauge showing another example of the connecting means.

In this case, the nozzle socket 42 is constituted by the communicating hole 21. However, upon request, as shown in FIG. 13, it is also possible to form the connecting nozzle 41 on the tubular body portion 18 side. In this case, the nozzle socket 42 is formed on the sub-cylinder part 9B side. specifically, the nozzle socket 42 is formed by the inner hole of the tubular portion 15.

Further, in the retaining means 43 in this example, the retaining is performed by rotating the pressure gauge 6 around the axis j of the connecting nozzle 41 to a predetermined angular position Q after the connecting nozzle 41 is inserted into the nozzle socket 42.

As the "predetermined angular position Q" in this example, an angular position such that the indicator portion 24 faces upward as shown in FIGS. 1 and 2 is set.

In the upper surface of the housing case 4, a display window 4H exposing the indicator portion 24 is disposed.

In particular, the retaining means 43 has a rectangular plate-shaped first plate part 45 extending from the connecting nozzle 41 outwards in a diameter direction, a rectangular plate-shaped second plate part 46 extending from the nozzle socket 42 diametrically, and an L-shaped hook portion 47 provided on one of the first and second plate parts 45 and 46 (the second plate part 46 in this example).

The front faces of the first and second plate parts 45 and 46 face each other in the insertion state Y.

Figure 9:
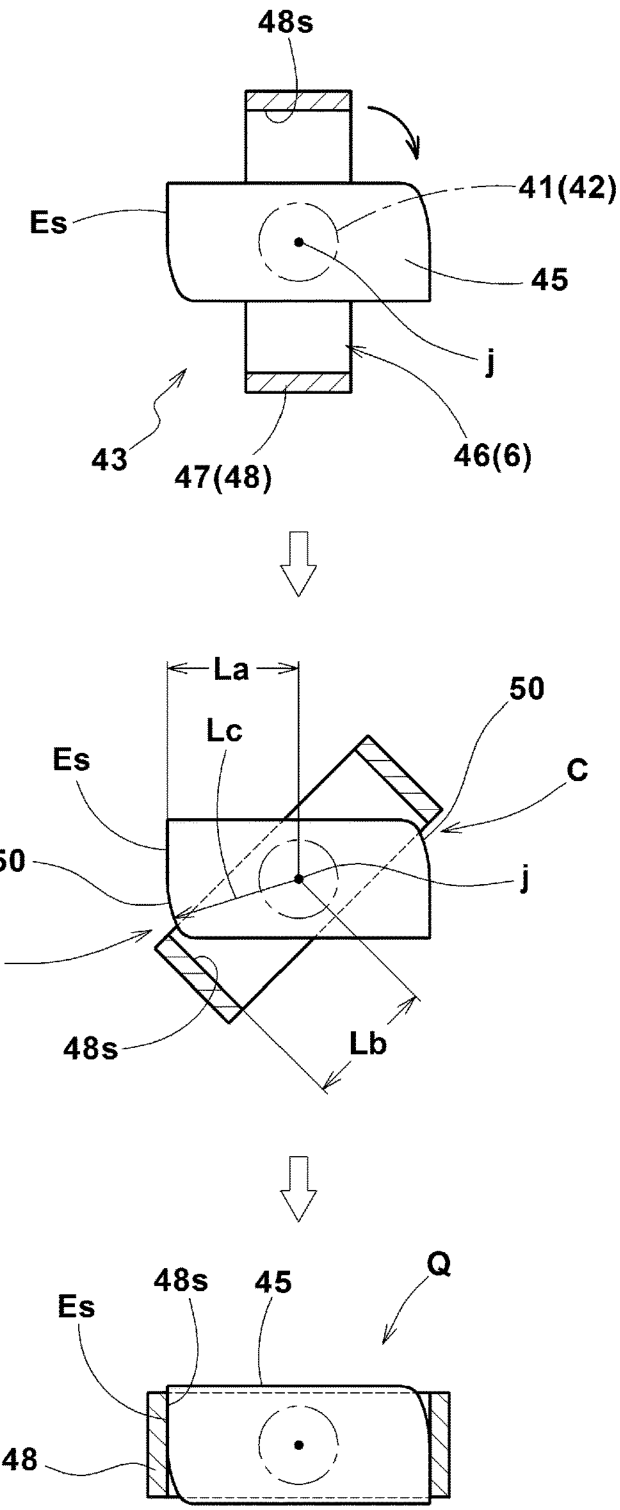
FIG. 9 a conceptual diagram illustrating the operation of a retaining means.

Further, the hook portion 47 has a rising piece portion 48 rising toward the front from each end in a diameter direction of one of the plate parts (the second plate part 46 in this example), and an engaging piece portion 49 bent inward in the diameter direction from the front end of each rising piece portion 48. As shown in FIG. 9, after insertion into the nozzle socket 42 of the connecting nozzle 41, the pressure gauge 6 is rotated around the axis j to the predetermined angular position Q. At this time, as shown in FIG. 10, between the one plate part (the second plate part 46 in this example) and the engaging piece portion 49, the other plate part (the first plate part 45 in this example) is sandwiched and retained.

In the retaining means 43, as shown in FIG. 9, the outer end surface Es in the diameter direction of the other plate part (first plate part 45 in this example) and the inner wall surface 48*s* in the diameter direction of the rising piece portion 48 contact with each other, and thereby the rotation of the pressure gauge 6 is stopped at the predetermined angular position Q.

In other words, the distance La from the axis j to an outer end surface Es is substantially equal to the distance Lb from the axis j to the inner wall surface 48*s* in the diameter direction of the rising piece portion 48.

In this case, the other plate part (the first plate part 45 in this example) is provided with arcuate chamfer portions 50 on a pair of corner portions C which form opposing corners across the axis j.

Incidentally, the distance Lc from the axis j to the chamfer portion 50 is not more than the distance Lb to permit the rotation up to the angular position Q.

The retaining means 43 has an anti rotation return means 50 to prevent a rotational return motion of the pressure gauge 6 from the predetermined angular position Q.

Figure 11:
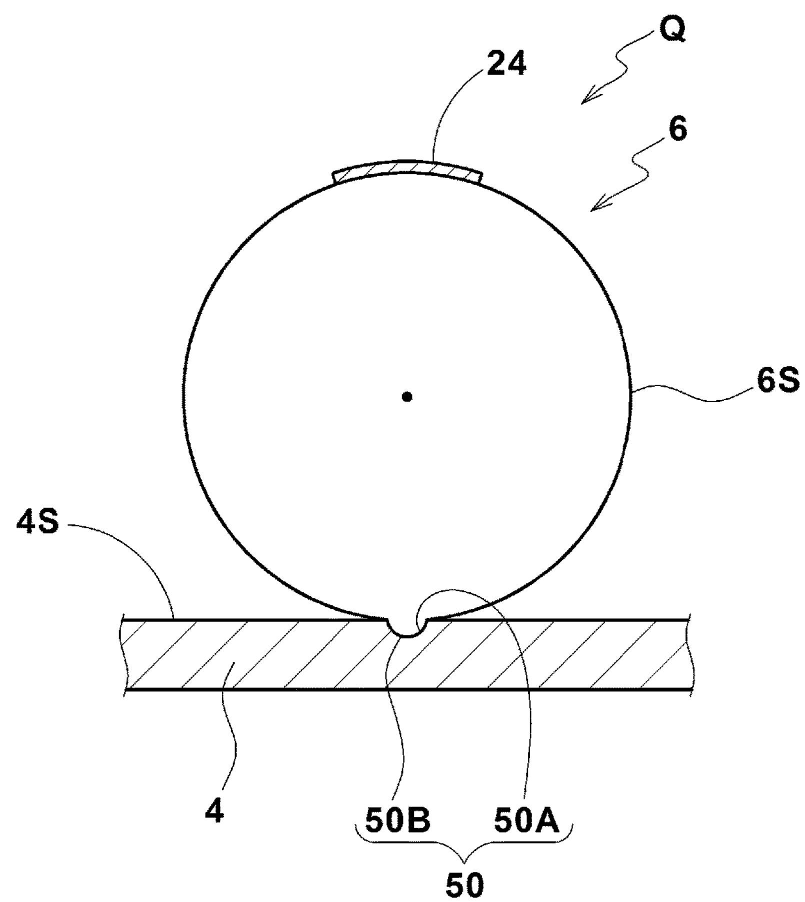
FIG. 11 a conceptual diagram showing an anti rotation return means.

In this example, as conceptually shown in FIG. 11, the anti rotation return means 50 is composed of an engaging recess 50A formed on one of the outer peripheral 6*s* of the pressure gauge 6 and the inner surface 4*s* of the housing case 4, and an engaging projection 50B formed on the other and fitting into the engaging recess 50A.

As the engaging recess 50B, dimple-shaped and groove-shaped can be employed as appropriate.

Figure 12:
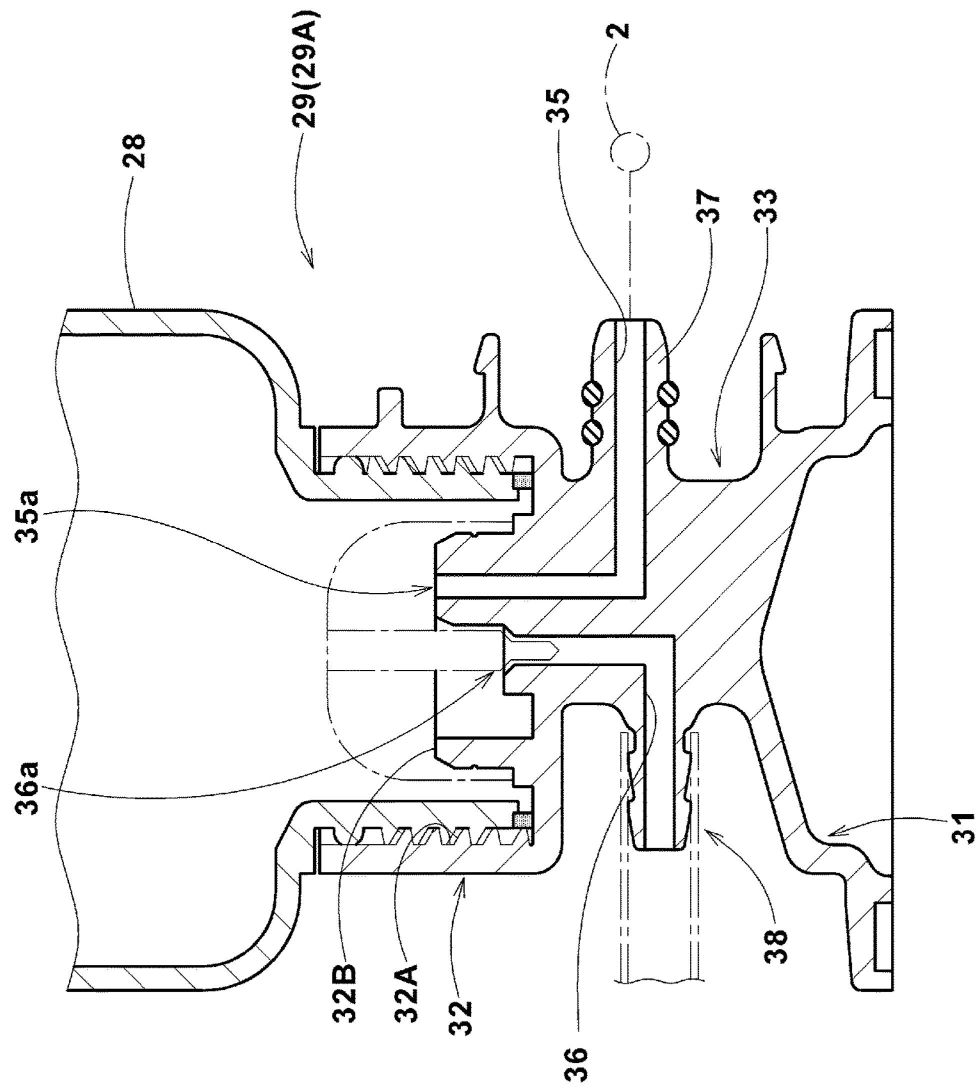
FIG. 12 a cross-sectional view showing an extraction cap.

As shown in FIG. 12, the extraction cap 29 in this example has a cap main body 29A integrally having a bottom plate portion 31 forming a bottom surface, a bottle mounting portion 32 for attaching the mouth portion of the bottle container 28, and a constricted part 33 disposed therebetween.

within the cap main body 29A, there are formed a first flow path 35 extending from the intake port portion 37 into the mouth portion of the bottle container 28, and a second flow path 36 extending from the outlet port portion 38 into the mouth portion of the bottle container 28.

The bottle mounting portion 32 has a mounting recess 32A to which the mouth portion of the bottle container 28 is fixed, and a boss portion 32B raising from the bottom of the mounting recess 32A.

The mounting recess 32A can be screwed to the mouth portion of the bottle container 28 by utilizing an inside screw formed on the inner wall surface of the mounting recess 32A.

In the top surface of the boss portion 32B, a first flow path opening 35*a* forming the upper end of the first flow path 35, and a second flow path opening 36*a* forming the upper end of the second flow path 36 are opened.

Figure 14:
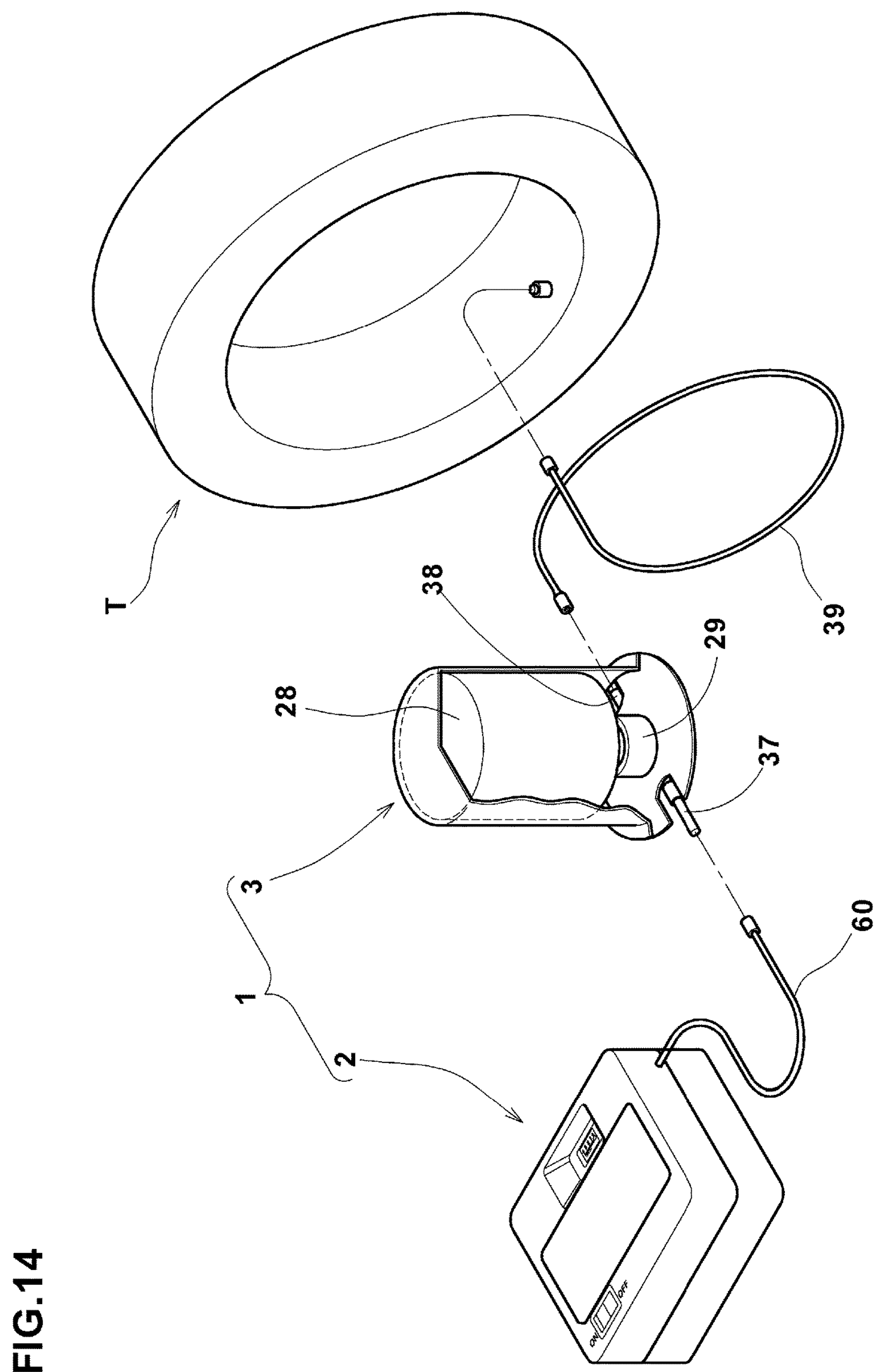
FIG. 14 a perspective view showing another example of the puncture repair kit.

In the puncture repair kit 1, as shown in FIG. 14, the intake port portion 37 of the bottle unit 3 and the compressed air discharging port portion 2A of the compressor apparatus 2 may be connected with each other by the use of a hose 60.

While detailed description has been made of an especially preferable embodiment of the present invention, the present invention can be embodied in various forms without being limited to the illustrated embodiment

Working Example

In order to confirm the effects of the present invention, a compressor device having the internal structure shown in FIG. 2 and employing a pressure gauge having the structure shown in FIGS. 5-7 was experimentally manufactured as working Example.

Further, Comparative Example not provided with the exhaust port in the tubular body portion of the pressure gauge, and Conventional Example employing a commercially available Bourdon tube type pressure gauge were experimentally manufactured. Comparative Example and conventional Example had relief valves separately attached thereto.

Then, each compressor device was connected to the tire, and the internal pressure of the tire was increased from 0 to 250 kPa.

In the case of conventional Example, when the indicated pressure became the prescribed pressure (250 kPa), the relief valve operated, and the increase in the tire pressure (actual tire pressure) was controlled.

However, when the increasing of the pressure was continued, a divergence between the indicated pressure and the tire pressure (actual tire pressure) occurred, and the tire pressure began to rise gradually although the indicated pressure was constant.

In the case of Comparative Example, similarly to conventional example, when the increasing of the pressure was continued after the relief valve operated, a divergence between the indicated pressure and the tire pressure (actual tire pressure) occurred, and the tire pressure began to rise gradually although the indicated pressure was constant.

In the case of working Example, the piston was moved until the indicated pressure became the prescribed pressure (250 kPa), and the movement of the piston was stopped when exceeded the exhaust port. And the compressed air was exhausted from the exhaust port, and an increase in the tire pressure was controlled. In other words, it functioned as a relief valve. Even when the increasing of the pressure was continued, the divergence between the indicated pressure and the tire pressure was not observed.

Table 1 shows the above results.

TABLE 1

| pressures gauge | Conventional example | Comparative example | Working example |
|---|---|---|---|
| presence or absence of exhaust port | absence | absence | presence |
| presence or absence of relief valve | presence | presence | absence |
| presence or absence of chamber | absence | absence | absence |
| relief function | presence | presence | presence |
| divergence of pressure | presence | presence | absence |

As shown in Table 1, it was confirmed that the working Example can suppress the divergence of the pressure while controlling the compressed air to the prescribed pressure without using a relief valve and a chamber.

DESCRIPTION OF THE CODES

1 puncture repair kit
2 compressor device
3 bottle unit
5 compressor main body
6 pressure gauge
9 cylinder
9A main cylinder part
9B sub-cylinder part
12A pump chamber
12B surge chamber
18 tubular body portion
19 piston
19C blindfold portion
20 spring
21 communicating hole
22 cap

23 seal ring
24 indicator portion
25 exhaust port
27 guide portion
28 bottle container
29 extraction cap
37 intake port portion
38 outlet port portion
40 connecting means
41 connecting nozzle
42 nozzle socket
43 retaining means
45 first plate part
46 second plate part
47 hook portion
48 rising piece portion
48*s* inner wall surface
49 engaging piece portion
50 chamfer portion
51 anti rotation return means
C corner portion
Es outer end surface

The invention claimed is:

1. A puncture repair kit comprising:

a compressor device, and a bottle unit comprising a bottle container containing a puncture repair liquid, and an extraction cap fitted to a mouth portion of the bottle container, wherein the extraction cap has an intake port portion for feeding compressed air from the compressor device into the bottle container, and an outlet port portion for taking out the puncture repair liquid and the compressed air in succession from the bottle container by the feeding of the compressed air, and wherein the compressor device comprises a compressor main body having a cylinder having a main cylinder part forming a pump chamber for compressing the air, and a sub-cylinder part forming a surge chamber being contiguous to the main cylinder part and receiving the compressed air from the pump chamber, and a pressure gauge for measuring the pressure of the compressed air in the surge chamber, the pressure gauge comprising a tubular body portion which is provided in a front end portion with a communicating hole communicating with the surge chamber, and in which a cap is attached to a rear end portion, a piston having a seal ring sealing between the piston and the inner peripheral surface of the tubular body portion, and being movable together with the seal ring within the tubular body portion in the longitudinal direction by the compressed air from the communicating hole, a spring disposed between the piston and the cap so as to bias the piston toward the front end portion, and changing displacement of the spring by the magnitude of the pressure of the compressed air, an indicator portion disposed on a peripheral wall of the tubular body portion and indicating the amount of movement of the piston, wherein at least a part of the tubular body portion where the indicator portion is formed is transparent, and the seal ring is a pointer of the indicator portion and visible through the transparent part to indicate the moved position of the piston, and an exhaust port formed on the peripheral wall of the tubular body portion, wherein, when the compressed air reaches to a prescribed pressure and the seal ring moves beyond the exhaust port, the exhaust port communicates with the communicating hole, and exhausts the compressed air.

2. The tire puncture repair kit as set forth in claim 1, wherein the tubular body portion is formed from a transparent material.

3. The tire puncture repair kit as set forth in claim 2, wherein the piston has a tubular blindfold portion covering the spring.

4. The tire puncture repair kit as set forth in claim 1, wherein the cap has a guide portion for guiding the piston concentrically.

5. The tire puncture repair kit as set forth in claim 1, wherein the pressure gauge and the sub-cylinder part are connected through a connecting means comprising:

a connecting nozzle which is provided on one of the tubular body portion and the sub-cylinder part and projects toward the other of the tubular body portion and the sub-cylinder part, a nozzle socket which is provided on the other of the tubular body portion and the sub-cylinder part, and into which the connecting nozzle is inserted concentrically and hermetically, and a retaining means for preventing the connecting nozzle from becoming uninserted from the nozzle socket.

6. The tire puncture repair kit as set forth in claim 5, wherein the retaining means exerts a retention function by rotating the pressure gauge around an axis j of the connecting nozzle up to a predetermined angular position after the insertion of the connecting nozzle into the nozzle socket.

7. The tire puncture repair kit as set forth in claim 6, wherein the retaining means has a rectangular plate-shaped first plate part extending outwardly in a diameter direction from the connecting nozzle, a rectangular plate-shaped second plate part extending in a diameter direction from the nozzle socket and having a front face facing a front face of the first plate part in the inserted state, and a hook portion provided on one of the first and second plate parts, wherein the hook portion is L-shaped and has a rising piece portion extending away from the connecting nozzle or from the nozzle socket from each end in a diameter direction of said one of the first and second plate parts, and an engaging piece portion bent inward in the diameter direction from a distal end of each rising piece portion, and between the one of the plate parts and the engaging piece portion, the other plate part is sandwiched and retained by rotating the pressure gauge to the predetermined angular position.

8. The tire puncture repair kit as set forth in claim 7, wherein the other plate part has arcuate chamfer portions on a pair of corner portions which form opposing corners across the axis j.

9. The tire puncture repair kit as set forth in claim 8, wherein the retaining means stops the rotation of the pressure gauge at the predetermined angular position by contacting an outer end face in the diameter direction of the other plate part with an inner wall surface in the diameter direction of the rising piece portion.

10. The tire puncture repair kit as set forth in claim 9, wherein the retaining means has an anti rotation return means to prevent a rotational return motion of the pressure gauge from the predetermined angular position.

11. The tire puncture repair kit as set forth in claim 2, wherein the cap has a guide portion for guiding the piston concentrically.

12. The tire puncture repair kit as set forth in claim 3, wherein the cap has a guide portion for guiding the piston concentrically.

* * * * *